US007616285B2

(12) United States Patent
Koike et al.

(10) Patent No.: US 7,616,285 B2
(45) Date of Patent: Nov. 10, 2009

(54) ELECTRONIC CIRCUIT WIRING AND DISPLAY DEVICE

(75) Inventors: Ryuya Koike, Kanagawa (JP); Takayuki Itou, Kanagawa (JP); Takashi Toyoda, Kanagawa (JP)

(73) Assignees: Sony Corporation, Tokyo (JP); Kabushiki Kaisha Toyota Jidoshokki, Aichi (JP)

( * ) Notice: Subject to any disclaimer, the term of this patent is extended or adjusted under 35 U.S.C. 154(b) by 235 days.

(21) Appl. No.: 10/580,690

(22) PCT Filed: Nov. 18, 2004

(86) PCT No.: PCT/JP2004/017185

§ 371 (c)(1), (2), (4) Date: May 26, 2006

(87) PCT Pub. No.: WO2005/052894

PCT Pub. Date: Jun. 9, 2005

(65) Prior Publication Data

US 2007/0096153 A1 May 3, 2007

(30) Foreign Application Priority Data

Nov. 28, 2003 (JP) ............................. 2003-399004

(51) Int. Cl.
*G02F 1/1345* (2006.01)

(52) U.S. Cl. ...................................................... 349/152

(58) Field of Classification Search .................. 349/152
See application file for complete search history.

(56) References Cited

U.S. PATENT DOCUMENTS 5,220,443 A * 6/1993 Noguchi ...................... 349/40

FOREIGN PATENT DOCUMENTS

| | | |
|---|---|---|
| JP | 08-166595 | 6/1996 |
| JP | 10-148840 | 6/1998 |
| JP | 2965687 | 8/1999 |
| JP | 2000-019556 | 1/2000 |
| JP | 2001-100233 | 4/2001 |

OTHER PUBLICATIONS

PCT International Search Report for PCT/JP2004/012292 mailed on Mar. 1, 2005.

* cited by examiner

*Primary Examiner*—Charlie Peng
(74) *Attorney, Agent, or Firm*—Rader, Fishman & Grauer PLLC

(57) ABSTRACT

Electronic circuit wiring wherein wiring breakdown due to electrostatic discharge is reduced, the yield is improved, and the reliability of a display panel is improved, and a display device provided with the same, having an effective display region 12 formed on a board and electronic circuit wiring 13 arranged so as to surround the effective display region 12 in order to protect the effective display region from static electricity and laid so as to include a crossover region 15 partially crossing other wiring via an insulation film, wherein the electronic circuit wiring 13 includes a start point terminal A11, an end point terminal B11 arranged on the start point terminal All side via the crossover region 15, and a resistor element R11, the resistor element R11 being connected to the start point terminal A11 side with respect to the crossover region 15.

8 Claims, 5 Drawing Sheets

FIG. 2A PRINCIPAL PORTION
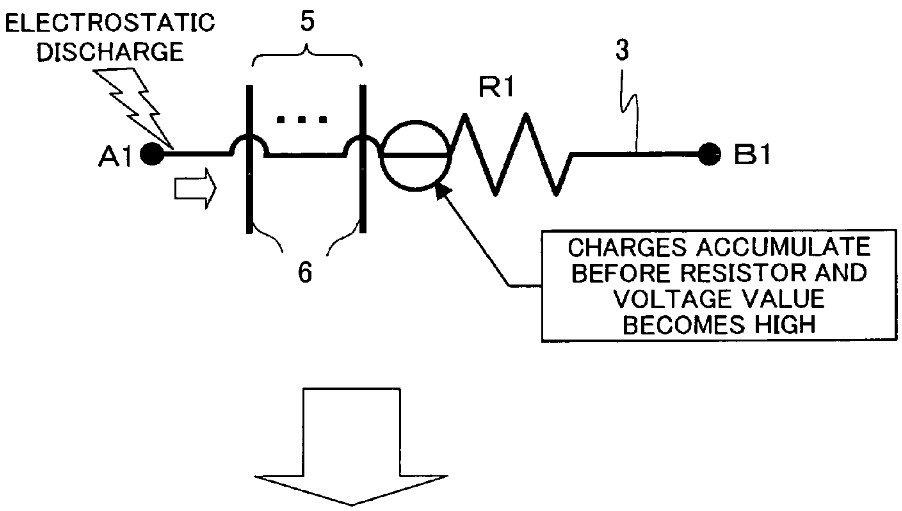
FIG. 2B EQUIVALENT CIRCUIT
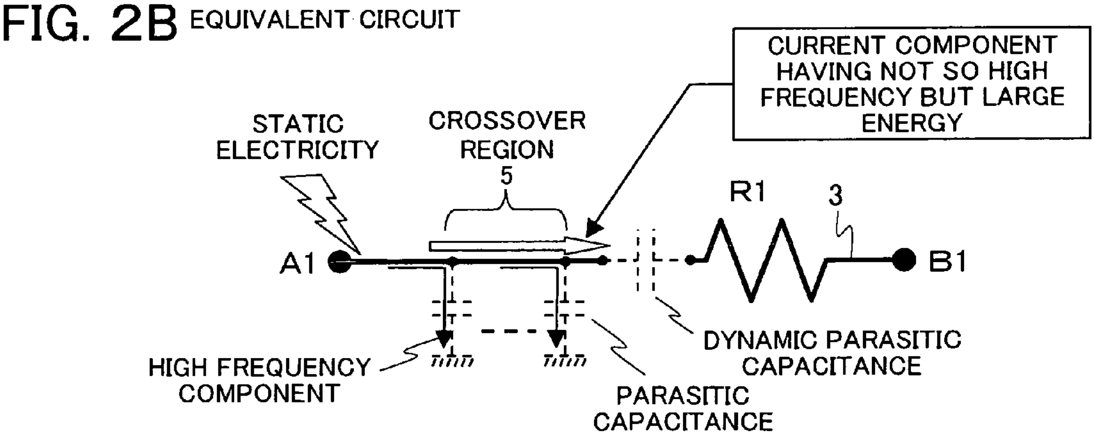

FIG. 5A PRINCIPAL PORTION
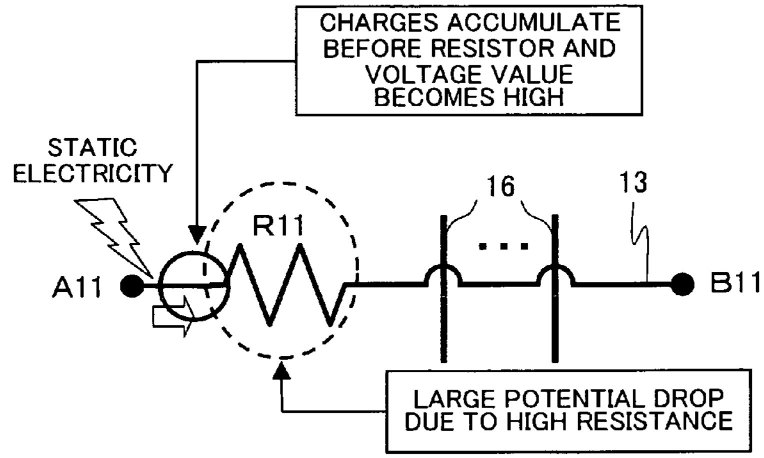
FIG. 5B EQUIVALENT CIRCUIT
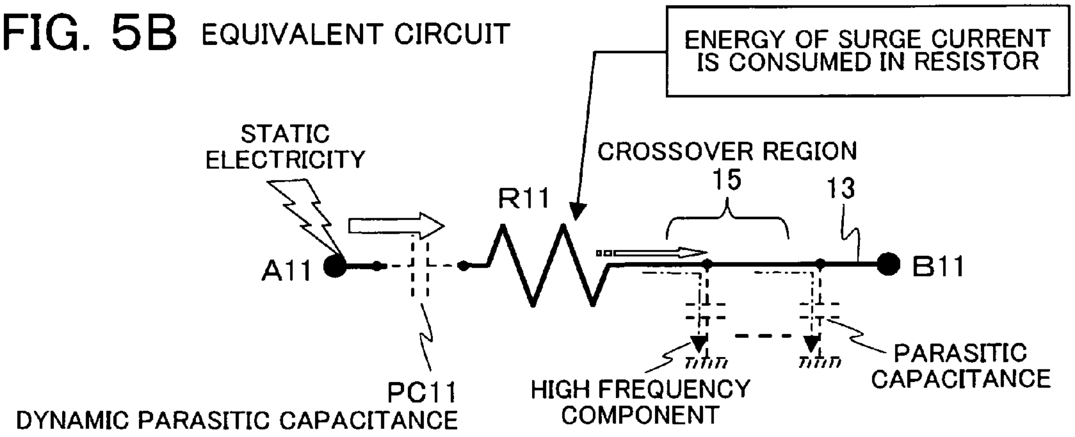

ELECTRONIC CIRCUIT WIRING AND DISPLAY DEVICE

TECHNICAL FIELD

The present invention relates to electronic circuit wiring structured to protect the circuit from electrostatic discharge etc. by being laid at the circumferential edge of the board so as to surround the internal main circuits and opened at one location and a liquid crystal display device panel or other display device provided with the same.

BACKGROUND ART

A liquid crystal display panel or other display device configured to protect the circuit from electrostatic discharge etc. is known (see for example Patent Document 1 and Patent Document 2).

For example, a liquid crystal display panel or other display panel is provided with a metal open curve electronic circuit wiring region structured to protect it against noise, malfunctions, breakdown, etc. due to electrostatic discharge by being laid at the circumferential edge of the board so as to surround the internal circuit and opened at one location.

FIG. 1 is a view schematically showing a usual display panel provided with an open curve electronic circuit wiring portion.

The display panel 1, as shown in FIG. 1, is formed with a rectangular effective display (pixel) region 2 at a center portion. The open curve electronic circuit wiring 3 is laid at the circumferential edge of this effective display region 2.

This open curve electronic circuit wiring 3 includes a start point terminal A1 and an end point supply terminal B1. The end point terminal B1 is formed by a power terminal or ground terminal having a larger discharge effect in comparison with the start point terminal A1.

These start point terminal A1 and end point terminal B1 are connected to a flexible connector terminal 4 disposed at a left side edge la in the illustration of the display panel 1.

On the route of the open curve electronic circuit wiring 3, a high resistance element R1 is connected. A region 5 crossing over a plurality of wirings 6 via an insulation film is also provided.

In this crossover region 5, for example, pixel drive wiring of the effective display region 2 is laid at the bottom side of the open curve electronic circuit wiring 3 via the insulation film etc.

Further, in the usual display panel 1, the open curve electronic circuit wiring 3 was arranged in the sequence of [start point terminal A1→ crossover region 5→ high resistance element R1→ end point terminal B1].

Patent Document 1: Japanese Patent Publication (A) No. 2000-19556

Patent Document 2: Japanese Patent No. 2965687

DISCLOSURE OF THE INVENTION

Problems to be Solved by the Invention

As explained above, in the usual display panel 1, the open curve electronic circuit wiring 3 is arranged in the sequence of [start point terminal A1→ crossover region 5→ high resistance element R1→ end point terminal B1], therefore charges accumulate before the resistor element R1, so the voltage supplied to the capacitor portion of the crossover region 5 becomes larger than necessary. As a result, defects where the breakdown voltage of the thin insulation film is exceeded, insulation breakage occurs, and the upper and lower wirings are short-circuited, so the problem arises that the yield in panel production and the reliability drop.

When electrostatic discharge occurs, for an extremely short time, a large surge current of about 30 amperes sometimes instantaneously flows in the open curve electronic circuit wiring 3 in the sequence of [start point terminal A1→ crossover region 5→ high resistance element R1→ end point terminal B1].

In this case, charges tend to accumulate before the high resistance element R1, so the voltage value at that location instantaneously becomes high.

For this reason, the voltage between the upper and lower wirings of the crossover region 5 rises, the breakdown voltage of the insulation film is exceeded, insulation breakdown finally occurs, and the wiring ends up breaking.

This problem will be explained in further detail by illustration.

FIG. 2A and FIG. 2B are diagrams simply showing a layout pattern in the display panel 1 of FIG. 1. FIG. 2A shows principal portions thereof, while FIG. 2B shows an equivalent circuit thereof.

Note that, in the equivalent circuit of FIG. 2B, a capacitance PC inserted in series with the resistor is a dynamic parasitic capacitance generated when a high current of the electrostatic discharge is injected.

Assuming now that a surge current due to electrostatic discharge flows in the open curve electronic circuit wiring 3 from the start point terminal A1 toward the end point terminal B1, a current component having a high frequency included in the surge current IS flows to a ground GND through the parasitic capacitance PC formed in the crossover region 5.

On the other hand, a component having not so high a frequency but a large energy flows up to immediately before the resistor element R1 without consuming almost any energy and raises the potential at that location.

As a result, the capacitance PC formed in the crossover region 5 exceeds the breakdown voltage, the insulation film between the upper and lower wirings causes insulation breakdown, and a short-circuit of the upper and lower wirings occurs.

Further, Patent Document 1 and Patent Document 2 do not consider at all the disadvantages that the voltage between the upper and lower wirings of the crossover region 5 rises, exceeds the breakdown voltage of the insulation film, finally causes insulation breakdown, and causes the wiring to break.

An object of the present invention is to provide electronic circuit wiring reducing wiring breakdown due to the electrostatic discharge, improving the yield, and improving the reliability of the display panel and a display device provided with the same.

Means For Solving The Problems

To achieve the above object, a first aspect of the present invention, there is provided an electronic circuit wiring laid so as to surround a main circuit formed on a board in order to protect the main circuit from static electricity and laid so as to include a cross region partially crossing other wiring via an insulation film, having a start point terminal, an end point terminal arranged on the start point terminal side via the cross region, and a resistor element, the resistor element being connected to the start point terminal side with respect to the cross region.

According to a second aspect of the present invention, there is provided a display device having an effective display region formed on a board and electronic circuit wiring laid so as to surround the effective display region in order to protect the effective display region from static electricity and laid so as to include a cross region partially crossing the other wiring via an insulation film, wherein the electronic circuit wiring includes a start point terminal, an end point terminal arranged on the start point terminal side via the cross region, and a resistor element, the resistor element being connected to the start point terminal side with respect to the cross region.

Preferably, the end point terminal is a terminal having a discharge effect with respect to the start point terminal.

Preferably, the end point terminal is connected to a power line having a predetermined potential.

Preferably, the end point terminal is grounded.

According to the present invention, for example, a surge current due to an electrostatic discharge tries to flow in the electronic circuit wiring from the start point terminal toward the end point terminal.

At this time, the phenomenon occurs that the electrical potential rises immediately before the resistor element, but a large potential drop occurs when it passes through the resistor element as the current. As a result, the potential of the crossover region does not rise so much.

In other words, a considerable part of the energy of the surge current is first consumed in the resistor element, therefore a large energy does not reach the crossover region.

Accordingly, there is seldom any short-circuit between the upper and lower wirings due to insulation breakdown in the crossover region.

Effect of the Present Invention

According to the present invention, there are the advantages that wiring breakdown due to the electrostatic discharge is reduced, the yield is improved, and the reliability is improved.

BRIEF DESCRIPTION OF THE DRAWINGS

FIGS. 2A and 2B are diagrams simply showing a layout pattern in the display panel of FIG. 1, in which FIG. 2A is a diagram showing principal portions, and FIG. 2B is an equivalent circuit diagram thereof.

FIGS. 5A and 5B are diagrams simply showing the layout pattern in the display panel of FIG. 3, in which FIG. 5A is a diagram showing the principal portions thereof, and FIG. 5B is an equivalent circuit diagram thereof.

DESCRIPTION OF NOTATIONS

10 . . . panel type display device, 11 . . . display panel, 12 . . . effective display (pixel) region, 13 . . . open curve electronic circuit wiring, 14 . . . flexible connector terminal, 15 . . . crossover region, 16 . . . cross wiring, R11 . . . high resistance element R11

DESCRIPTION OF THE PREFERRED EMBODIMENTS

Below, an explanation will be given on an embodiment of the present invention with reference to the drawings.

Figure 3:
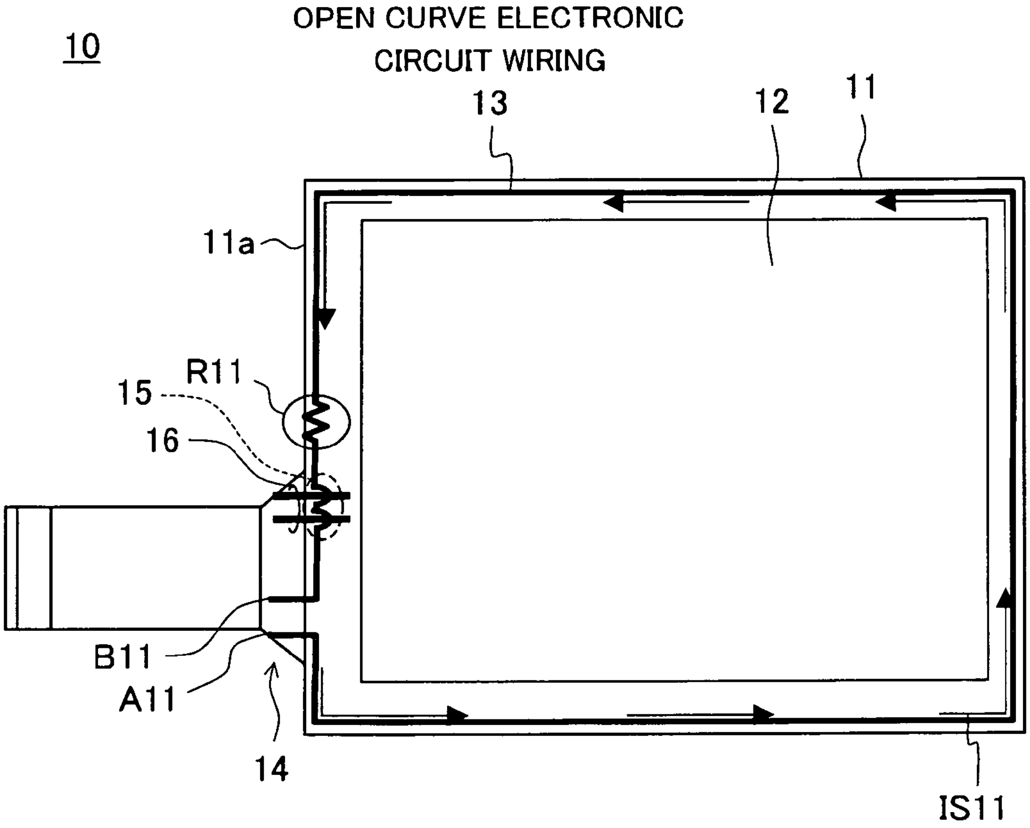
FIG. 3 is a view schematically showing a panel type display device of the present invention provided with the open curve electronic circuit wiring portion therein.

FIG. 3 is a view schematically showing a panel type display device according to the present invention provided with an open curve electronic circuit wiring portion.

A panel type display device 10 according to the present embodiment has a display panel 11, an effective display (pixel) region 12 as a main circuit, open curve electronic circuit wiring 13, a flexible connector terminal 14, a crossover region 15, cross wirings 16, and a high resistance element R11 as principal components.

In the panel type display device 10 according to the present embodiment, in the display panel 11, as shown in FIG. 3, the rectangular effective display (pixel) region 12 is formed in the center portion. At the circumferential edge of this effective display region 12, the open curve electronic circuit wiring 13 made of a metal, for example, aluminum is laid.

In the effective display region 12, pixel regions including pixel cells (for example, liquid crystal cells) and thin film transistors (TFTs) are arranged in a matrix. A plurality of scanning lines for supplying scanning signals to TFTs and a plurality of signal lines for supplying display signals to pixel cells via TFTs are arranged so as to cross each other.

Namely, the panel type display device 10 according to the present embodiment is configured as an active matrix type liquid crystal display device.

This open curve electronic circuit wiring 13 includes a start point terminal A11 and an end point terminal B11. The end point terminal B11 is formed as a power terminal or ground terminal having a larger discharge effect in comparison with the start point terminal A11.

These start point terminal A11 and end point terminal B11 are connected to the flexible connector terminal 14 disposed at the edge 11*a* on the left side in the illustration of the display panel 11.

On the route of the open curve electronic circuit wiring 13, a high resistance element R11 (for example with a resistance value of 1M ohm) is connected and a cross region (explained as the crossover region 15 in the present embodiment) over which a plurality of wirings 16 cross (cross under) via insulation films is provided.

In this crossover region 15, pixel drive wiring etc. of the effective display region 12 are laid at for example the bottom side of the open curve electronic circuit wiring 13 via an insulation film etc.

Figure 4:
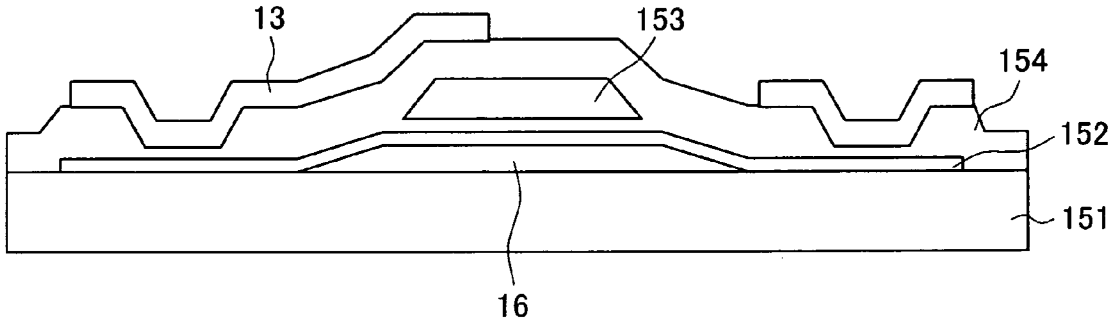
FIG. 4 is a schematic sectional view of a crossover region according to the present embodiment.

FIG. 4 is a schematic sectional view of the crossover region 15 according to the present embodiment.

In the crossover region 15, as shown in FIG. 4, cross wiring 16 such as pixel drive wiring of the effective display region 12 is formed on an insulation board 151. An insulation film 152 is formed on the cross wiring 16 and the insulation board 151 so as to cover the cross wiring 16.

On the insulation film 152 and the insulation board 151, an inter-layer insulation film 154 including a stopper. film 153 is formed.

On the inter-layer insulation film 154, the open curve electronic circuit wiring 13 is formed so as to partially overlap the cross wiring 16 via the insulation film 152 and the inter-layer insulation film 154.

In the panel type display device 10 according to the present embodiment, the open curve electronic circuit wiring 13 is arranged in a sequence of [start point terminal A11→ high resistance element R11→ crossover region 15→ end point terminal B11].

Namely, in the present embodiment, the resistor element R11 is arranged on the start point terminal A11 side with respect to the crossover region 15.

In other words, the positions of the resistor element R15 and the crossover region 15 between the start point terminal A11 and the end point terminal B11 of the open curve electronic circuit wiring 13 are considered so that the resistor element R11 is arranged nearer the start point terminal A11, and the crossover region 15 comes next.

In this case, the surge current IS11 due to the electrostatic discharge flows in the open curve electronic circuit wiring 13 in the sequence of [start point A11→ high resistance element R11→ crossover region 15→ end point B11].

In this case, charges accumulate before the resistor element R11, the voltage instantaneously becomes high there, but the rise of the voltage between wirings of the crossover region 15 is small, so disconnection due to the insulation breakdown does not easily occur.

Below, a further detailed explanation will be given of why disconnection due to the insulation breakdown seldom occurs by illustration.

FIG. 5A and FIG. 5B are diagrams simply showing the layout patterns in the display panel 11 of FIG. 3. FIG. 5A shows principal portions thereof, and FIG. 5B is an equivalent circuit thereof.

Note that, in the equivalent circuit of FIG. 5B, the capacitance PC11 inserted in series with the resistor is a dynamic parasitic capacitance generated when a high current of the electrostatic discharge is injected.

Assume that, as shown in FIG. 5A and FIG. 5B, a surge current IS11 due to electrostatic discharge tries to flow from the start point terminal A11 toward the end point terminal B11 in the open curve electronic circuit wiring 13.

At this time, the phenomenon occurs of the potential rising immediately before the resistor element R11, but a large potential drop occurs when it passes through the resistor element R11 as current. As a result, the potential of the crossover region 15 does not rise so much.

In other words, most of the energy of the surge current IS11 is consumed first in the resistor element R11, therefore the large energy does not reach the crossover region 15.

Figure 1:
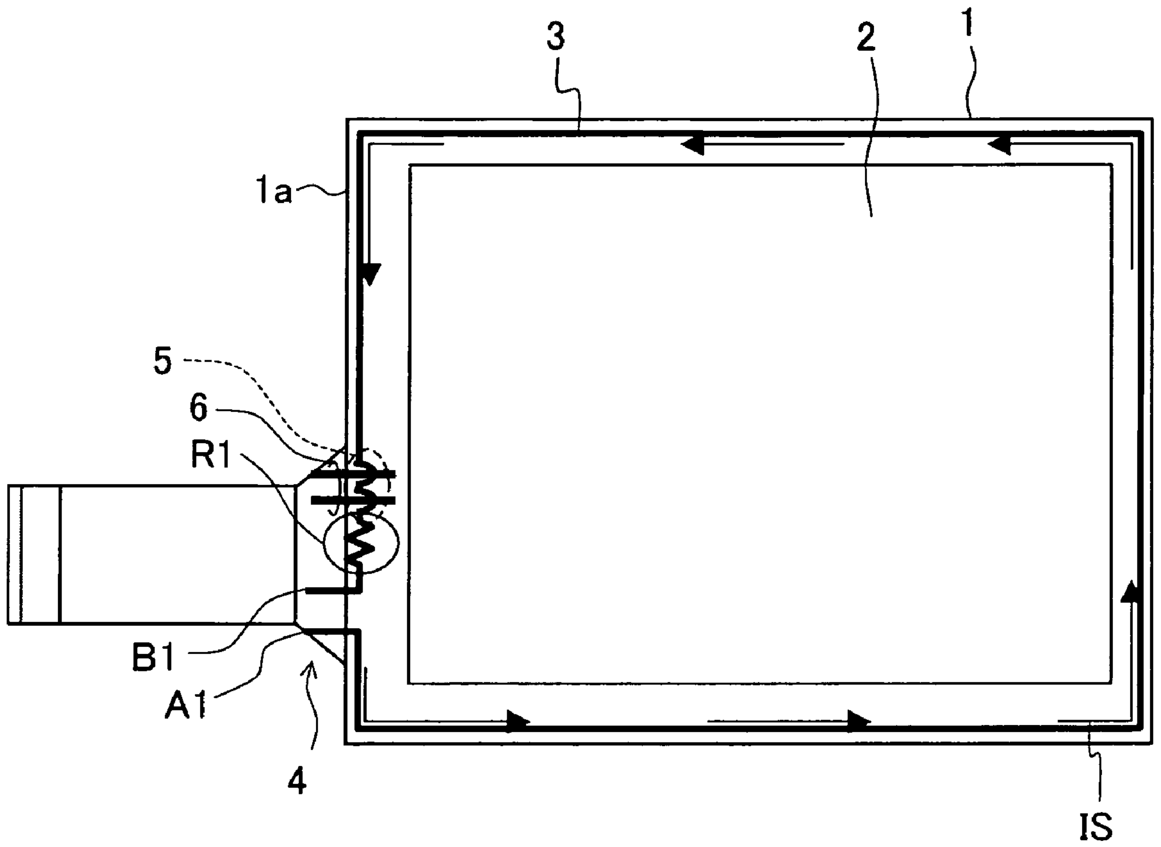
FIG. 1 is a view schematically showing a usual panel type display device provided with an open curve electronic circuit wiring portion.

Accordingly, short-circuits between the upper and lower wirings due to insulation breakdown in the crossover region 5 as in the arrangement of FIG. 1 seldom occur.

As explained above, according to the present embodiment, provision is made of the effective display region 12 formed on the board and the electronic circuit wiring 13 arranged so as to surround the effective display region 12 in order to protect the effective display region 12 from static electricity and laid so as to include the cross region partially crossing the other wiring via the insulation film. The electronic circuit wiring 13 includes the start point terminal A11, the end point terminal B11 arranged on the start point terminal A11 side via the cross region, and the resistor element R11. The resistor element R11 is connected to the start point terminal A11 side with respect to the cross region, therefore, short-circuits between the upper and lower wirings due to insulation breakdown in the cross region seldom occur.

Accordingly, there are the advantages that wiring breakdown due to electrostatic discharge is reduced, the yield is improved, and the reliability of the display panel is improved.

Note that the present embodiment was explained by taking as an example a liquid crystal display panel, but the present invention can also be applied to other panel type display devices, for example an organic electroluminescence (organic EL) display device.

INDUSTRIAL APPLICABILITY

According to the present invention, wiring breakdown due to electrostatic discharge is reduced, the yield is improved, and the reliability of the display panel can be improved, therefore the invention can be applied to a liquid crystal display panel and other panel type display devices.

The invention claimed is:

1. Open curve electronic circuit wiring laid so as to surround a main circuit formed and opened at one location on a board in order to protect the main circuit from static electricity and laid so as to include a cross region partially crossing other wiring for connecting to drive the main circuit and to wiring extending toward outside of the board via an insulation film, comprising:
 a start point terminal,
 an end point terminal arranged on the start point terminal side via the cross region, and
 a resistor element,
 the resistor element being connected to the start point terminal side with respect to the cross region.

2. Electronic circuit wiring as set forth in claim 1, wherein the end point terminal is a terminal having a discharge effect with respect to the start point terminal.

3. Electronic circuit wiring as set forth in claim 2, wherein the end point terminal is connected to a power line having a predetermined potential.

4. Electronic circuit wiring as set forth in claim 3, wherein the end point terminal is grounded.

5. A display device, comprising:
 an effective display region formed on a board, and
 an open curve electronic circuit wiring laid so as to surround the effective display region formed and opened at one location on the board in order to protect the effective display region from static electricity and laid so as to include a cross region partially crossing the other wiring for connecting to drive the main circuit and to wiring extending toward outside of the board via an insulation film, wherein
 the electronic circuit wiring includes
 a start point terminal,
 an end point terminal arranged on the start point terminal side via the cross region, and
 a resistor element,
 the resistor element being connected to the start point terminal side with respect to the cross region.

6. A display device as set forth in claim 5, wherein the end point terminal is a terminal having a discharge effect with respect to the start point terminal.

7. A display device as set forth in claim 6, wherein the end point terminal is connected to a power line having a predetermined potential.

8. A display device as set forth in claim 7, wherein the end point terminal is grounded.

* * * * *